United States Patent [19]

Nicholson et al.

[11] 4,216,189

[45] Aug. 5, 1980

[54] SULFUR DIOXIDE REMOVAL PROCESS

[75] Inventors: Norman E. Nicholson, Stockton-on-Tees; John Scarlett, Kirk Merrington; John F. Flintoff, Middlesbrough, all of England

[73] Assignee: Davy Powergas, Inc., Lakeland, Fla.

[21] Appl. No.: 949,545

[22] Filed: Oct. 10, 1978

Related U.S. Application Data

[63] Continuation of Ser. No. 630,503, Nov. 10, 1975, abandoned.

[51] Int. Cl.$^2$ .................. C01B 17/00; C01B 17/45; C01D 5/00
[52] U.S. Cl. ................................. 423/242; 423/182; 423/551; 423/512 A
[58] Field of Search .......... 423/242 A, 242 R, 244 A, 423/244 R, 551, 182, 512 A

[56] References Cited

U.S. PATENT DOCUMENTS 3,971,844    7/1976    Schneider .................. 423/242 A

FOREIGN PATENT DOCUMENTS 489745    8/1938    United Kingdom ............... 423/242 A

*Primary Examiner*—O. R. Vertiz
*Assistant Examiner*—Gregory A. Heller
*Attorney, Agent, or Firm*—Bernard & Brown

[57] ABSTRACT

Sodium sulfate is purged from a sulfur dioxide removal system involving contact of a sulfur dioxide-containing gas with a solution containing sodium sulfite to absorb sulfur dioxide from the gas. The spent absorbing solution is regenerated by desorbing sulfur dioxide and recycled for further use. To avoid an unduly large build-up of sulfate in the system, at least a portion of the absorbing-desorbing medium, e.g. spent absorbing solution, containing sodium sulfate and a relatively large amount of sodium bisulfite is treated to reduce the amount of water in the medium so that there is precipitated therefrom up to about 10 weight percent undissolved solids containing sodium sulfate in greater concentration than would otherwise be obtained in the absorption-desorption cycle. The insolubles containing sodium sulfate are removed from the liquid, and the liquid can be returned to the sulfur dioxide removal system. In one preferred aspect of the invention, up to about 75 weight percent of the entire stream of spent absorbing solution is treated to precipitate therefrom up to about 10 weight percent undissolved solids which are relatively rich in sodium sulfate content. In the invention the sodium sulfate-containing solids can be separated from the liquid which is then subjected to a desorption operation to produce sulfur dioxide, and the latter operation can be conducted while maintaining at least about 25 weight percent undissolved solids in the desorption zone.

10 Claims, 1 Drawing Figure

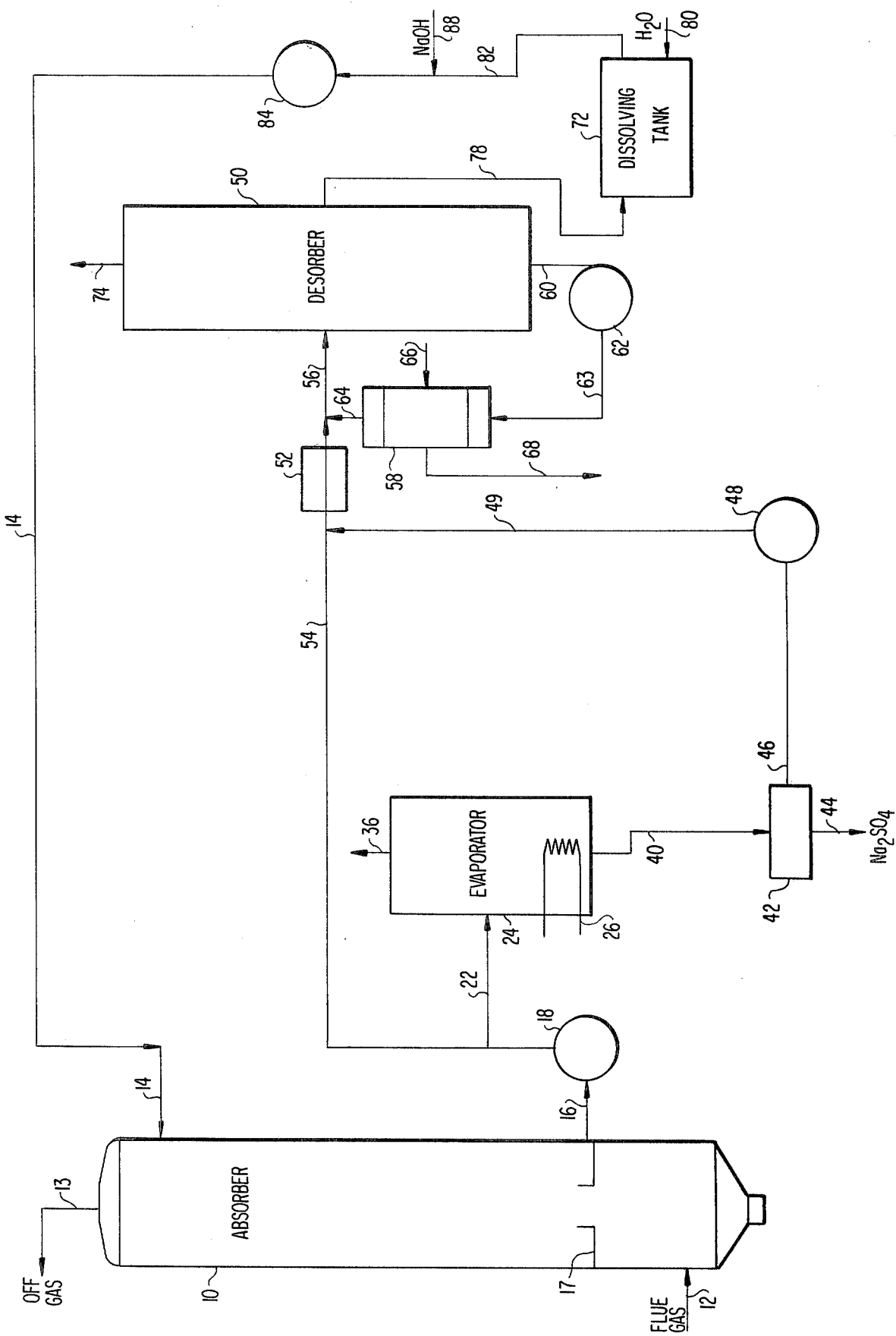

SULFUR DIOXIDE REMOVAL PROCESS

This is a continuation of application Ser. No. 630,503, filed Nov. 10, 1975, now abandoned.

This invention relates to the removal of sulfur dioxide from gas streams by contact with an aqueous sodium sulfite solution to absorb sulfur dioxide and provide a solution richer in sodium bisulfite which can be treated to desorb sulfur dioxide and regenerate the absorbing solution for reuse, and in which sodium sulfate is formed as a by-product in the absorption-desorption medium and must be purged from the system without undue loss of valuable sodium compounds. More particularly, the invention concerns a process for reducing the loss of desireable and valuable sodium compounds from the cyclic sulfur dioxide removal system by removing undesireable sodium sulfate from the absorption-desorption medium as solids containing an increased amount of sodium sulfate.

Sulfur dioxide is a recognized pollutant of the atmosphere and is produced by oxidation of sulfur or sulfur-bearing materials. Sulfur dioxide is found in significant amounts as a constituent of various waste gases such as smelter gases, off-gases from chemical plants, and stack or furnace gases from coal or oil-burning furnaces such as are used in electric power plants. Although the concentration of sulfur dioxide in such gases is generally minor, e.g., from about 0.001 up to about 5 mole percent, and is frequently less than about 0.5 mole percent (less than about 1% by weight), the emission of sulfur-dioxide may be substantial, particularly in industrial applications due to the large amount of sulfur-bearing material being processed. For instance, a modern electric plant having a 1,350,000 kw. capacity will burn up to about 15,000 tons of coal per day. Despite the fact that the concentration of sulfur dioxide in the stack gases from the electric plant can be low, e.g., of the order of 0.2 to 0.3 mole percent, the total sulfur dioxide produced may be in the neighborhood of 1,000 tons per day. Similarly, significant amounts of sulfur dioxide are produced in utilization of other fuels which may bear sulfur.

The removal of sulfur dioxide from sulfur dioxide-containing gases may be effected by treatment with an aqueous sodium sulfite solution. The operation of an efficient and economical system for removal of sulfur dioxide will be characterized not only by the efficiency of absorption of sulfur dioxide from the sulfur dioxide-containing gases, the efficiency of desorption of sulfur dioxide from the spent absorbing solution, and the purity of the sulfur dioxide product, but also by the minimization of loss of metal values. Sulfur dioxide-containing gas obtained, for instance, by burning sulfur-bearing mineral products and the like as fuels, can be contacted with sodium sulfite in an aqueous solution to form bisulfite, and thereby substantially reduce the sulfur dioxide content of the gas to, for instance, less than about 0.02 mole percent when the sulfur dioxide-containing gas comprises more than about 0.2 mole percent sulfur dioxide. The removal of sulfur dioxide from the gases is often up to about 95 percent or more. The spent absorbing solution can be heated to convert the bisulfite to sulfite and sulfur dioxide, and to generate a liquid or liquid-solid material which serves as the source of the absorbing solution. The sulfur dioxide can be drawn-off and cooled or compressed to provide a liquid product or sent as a gas to a sulfuric acid plant or sulfur plant. Regenerated absorbing solution can be recycled to the absorption zone. For additional information and further exemplification regarding sulfur dioxide removal systems which can advantageously employ the technology disclosed herein, see U.S. Pat. No. 3,607,037, 3,653,812, and 3,790,660, all of which are incorporated herein by reference.

The sulfur dioxide-containing gases to be treated usually contain oxidizing materials which facilitate oxidation such as sulfur trioxide, oxygen, elemental iron, and the like, and, particularly when the gases containing sulfur dioxide are derived from the combustion of fuel, other materials which may be present include oxides of nitrogen. At least some of these materials promote the oxidation of the sodium sulfite or bisulfite to sulfate. Sodium sulfate is an inert material for purposes of the sulfur dioxide absorption-desorption process, because sulfate cannot be regenerated to sulfite during the desorbing operation. Sulfate build-up therefore occurs in the sulfur dioxide absorption-desorption system. A portion of the absorbing-desorbing medium can be purged from the system to prevent unduly large amounts of inert sulfate from accumulating in the system. This purge may be a portion of the spent absorption solution or material obtained in the desorption of the sulfur dioxide from the absorbing solution. These purge materials, however, contain substantial amounts of sulfite or bisulfite, along with the sulfate, and when the purge is discarded, an undue expense may occur due to the accompanying loss of useable sodium values from the system which must be replaced by the addition of a suitable soluble sodium compound.

It has been proposed to purge sulfate from the absorption-desorption system more selectively with respect to sulfite or bisulfite values, and return the latter to the absorbing-desorbing system. Simple separation of sodium sulfate from sulfite and bisulfite in the spent absorbing solution by low temperature crystallization gives a sulfate-crystallization product containing minor amounts of sodium sulfite. A more selective separation of sulfate is thereby obtained but such processing involves undue expense because of the cooling requirements needed to reach the low crystallization temperatures and the necessity to reheat the crystallization mother liquor returned to the absorption-desorption system. Also the crystals obtained are in the hydrate form, and drying is required to facilitate handling if the product is to be further processed or sold. Large drying facilitates are, therefore, necessary to reduce not only the free water content but also the water of hydration of the material.

In another system for concentrating sodium sulfate so that it can be more economically separated from the sulfur dioxide removal system described above, a purge stream of spent absorbing solution is contacted with a gas containing sulfur dioxide to convert at least a portion of the sodium sulfite to the more soluble bisulfite. The stream is then cooled to crystallizing temperature and sodium sulfate precipitates more selectively. This procedure has disadvantages in that two separate treatments of the purge stream are required, i.e., sulfur dioxide contact followed by crystallization at a reduced temperature of, say, about 0° to 10° C., which is a considerable expense. The additional sodium bisulfite, formed in the treatment of the purge stream with sulfur dioxide, and contained in the resulting separated liquid stream added to the absorption-desorption cycle, leads to an additional heat requirement to convert the bisulfite to sulfite with the formation of sulfur dioxide. Moreover, in this operation the sodium sulfate contains sodium sulfate hydrates which, as noted above, may necessitate the provision of relatively large drying facilitates if the product is to be further handled or sold.

In British Pat. No. 489,745 there is described a sulfur dioxide removal system which although devoted mainly to the use of an aqueous ammonium sulfite absorbing medium, mentions the possible use of alkali metal sulfites, and the system is designed to purge sulfate. In the operation the spent absorption medium is desorbed of sulfur dioxide without precipitation of salts. The resulting solution is substantially saturated with sulfate and relatively unsaturated with respect to sulfite and bisulfite. The cooling of the solution, say from 110° to 50°-70° C. results in the precipitation of sulfate. This type of operation is undesirable since the system is apparently dependent upon the liquid from the sulfur dioxide desorption zone being relatively unsaturated with respect to sulfite which means that a large amount of absorption solution must be supplied for the removal of a given amount of sulfur dioxide.

In accordance with the present invention, there has been devised a highly advantageous procedure for reducing the amount of sodium sulfate in sodium sulfite-bisulfite, absorption-desorption systems for removing sulfur dioxide from gaseous streams. In the process of this invention it is not necessary to reach temperatures substantially below ambient, and the sodium sulfate removed can be in an essentially non-hydrated or anhydrous form. Accordingly, at least a portion of the aqueous sodium sulfite-bisulfite, absorbing-desorbing medium containing a relatively large quantity of sodium bisulfate is treated to remove water and thereby precipitate a limited amount of sodium sulfate-containing solids from the solution which solids have a higher sulfite concentration on a dry basis than the absorption-desorption medium from which they are formed. This treatment is continued for a sufficient length of time to ensure substantial precipitation of sodium sulfate, but is concluded before more than about 10 weight percent of undissolved solids is precipitated from the absorption desorption system medium treated. The material preferably treated in accordance with the invention is essentially spent absorption medium. In one manner of conducting the process of the invention, the removal of water and precipitation of solids may be effected without substantial conversion of bisulfite to sulfite and sulfur dioxide, e.g., there may be less than about 10 weight percent of the bisulfite so converted. The precipitated solids containing sodium sulfate can be readily removed from the resulting slurry by the use of conventional liquid-solid separation equipment to provide, at least initially, an essentially non-hydrated sulfate product which is relatively high in sodium sulfate content, advantageously at least about 50 weight percent, on a dry basis. The separated solids may contain a major amount of sodium sulfate, and a minor amount of sodium sulfite, preferably these amounts are at least about 70 weight percent sodium sulfate and less than about 30 weight percent sodium sulfite based on the total of these materials. The concentration of sodium sulfate in the precipitated solids is often at least about 2 times, on a dry basis, the concentration of sodium sulfate in the absorption-desorption medium from which the solids are formed by the evaporation of water.

In the method of the present invention, the aqueous absorbing-desorbing solution which undergoes water removal and sulfate precipitation for purging, contains a major weight amount of sodium bisulfite, a minor amount of sodium sulfate, and a minor amount of sodium sulfite, based on the total of these components. The solution may preferably contain this amount of bisulfite at the beginning of water removal or it may attain this concentration in the liquid phase during the removal of water. The material which is treated may contain at least about 25 weight percent of total salts, preferably at least about 30 weight percent, and often this amount may not exceed about 50 weight percent. The sodium sulfate content of this stream may usually not exceed about 10 weight percent, and preferably this amount may often not be above about 8 weight percent. The sodium sulfate content is generally at least about 1 weight percent, and preferably is about 3 to 7 weight percent. The weight ratio of sodium sulfite in the material treated for limited precipitation of solids usually is, or becomes during the treatment, at least about 0.7:1, preferably at least about 1:1. Although in general the higher the sulfate content in the material treated the purer the sodium sulfate obtained by the method of this invention, an increase in the amount of inert sodium sulfate material circulating in the absorption-desorption system has a detracting factor since there may be less active sodium present for a given amount of water in the system. As a result a greater quantity of circulating material would be required to provide a given sulfur dioxide absorption-desorption capacity. Often the absorbing-desorbing medium treated has about 0.1 to 10 weight percent sodium sulfite and about 15 to 40 weight percent sodium bisulfite, based on the total of these components and the sodium sulfate and water present. The stream may contain minor amounts of other materials, e.g., sodium thiosulfate.

The solution which undergoes water removal for sodium sulfate precipitation and purging generally contains initially of during the treatment, a mole ratio of sodium bisulfite to sodium sulfite of at least about 2:1, often at least about 3:1. The amount of sodium bisulfite in the material undergoing treatment as compared to the total active metal in the material may be alternatively expressed in terms of "s/c" which is defined as the number of moles of active sulfur, e.g., $SO_3=$ and $HSO_3-$, per 100 moles of water divided by the moles of active sodium per 100 moles of water. Thus, a pure sodium bisulfite solution would have an s/c of 1, and a pure sodium sulfite solution would have an s/c of 0.5. Sodium sulfate, for instance, does not provide active sulfur or active base. The s/c of the material treated in accordance with the process of this invention is preferably about 0.85 to 0.97.

In the present invention sodium sulfate is removed from the system by treating at least a portion of the aqueous absorption-desorption medium, preferably spent absorption solution, to evaporate a sufficient amount of water and precipitate a significant, but limited, from the aqueous absorption-desorption medium amount of solids. Thus the evaporation of water is conducted in a manner to have up to about 10 weight percent crystals precipitated from absorption-desorption medium, often at least about 1 weight percent, and preferably up to about 5 weight percent. The water content of the material which is subjected to evaporation may often be reduced by up to about 75 or more weight percent, preferably by at least about 10 weight percent, and the material generally remains sufficiently fluid to be readily pumpable. The operation is advantageously conducted at somewhat elevated temperatures which are sufficient to precipitate essentially non-hydrated crystals without excessive water removal. Generally, such temperatures are at least about 37 to 38° C., and to be more certain of having temperatures sufficient to form a non-hydrated product when it is precipitated, a temperature of at least about 40° C. is recommended. Suitable temperatures for accomplishing the desired evaporation of water thus include about 40° to 120° C., preferably about 40° to 90° C. The choice of temperature may depend on the pressure employed, and the pressure may be ambient, reduced or elevated. Advantageously, the pressure is about 10 to 20 psia, and preferably, essentially atmospheric pressure is used.

The slurry obtained in the water removal operation is subjected to liquid-solid separation to provide a separate solid phase which is relatively high in sulfate content. The separation may be done without reducing the temperature of the slurry, and the temperature may often be about 40° to 120° C., preferably about 40° to 90° C. The separated liquid phase or mother liquor can be charged to the absorption-desorption system, and preferably to its desorption zone. The separated solids may, if desired, be dried and they may undergo self-drying upon standing by the free water being taken up as water of hydration.

The amount of solids formed in the water evaporation stage of the process of this invention, and subsequently removed, is sufficient to prevent undue build-up of sodium sulfate in the absorption-desorption system. The amount of sulfate purged is preferably substantially equal to the amount of sulfate being formed in the absorption-desorption system. Also, the amount of solids formation required may depend on the purity of the sulfate in the precipitated and separated solid phase, as well as the amount of the total absorption-desorption medium which is subjected to the sulfate removal operation. Thus, up to the entire stream of absorption-desorption medium may be treated for sulfate removal in which case the percentage of solids formed may be less than if only a portion of the medium is subjected to the sulfate precipitation treatment. Generally, as the percentage of solids formed in the medium decreases the purity of the precipitated sulfate increases.

In one embodiment of the invention substantially the entire absorption-desorption medium is processed for water removal and sulfate precipitation. Alternatively, only a portion of this medium may be so treated, and in such case frequently about 10 to 90 weight percent of the total medium is treated in this manner, more often up to about 75 weight percent, say about 20 to 75 weight percent. Preferably, this amount is sufficient so that a maximum of about 5 weight percent solids need be precipitated to have an adequate purge of sodium sulfate. The liquid medium or mother liquor separated in the sulfate removal procedure is usually passed to the sulfur dioxide desorption stage since the liquid is high in bisulfite content. Depending on the amount of the mother liquor to be recycled it may be desirable to charge it to some other part of the absorption-desorption system. Make-up sodium values in the form of suitable water-soluble sodium compounds such as sodium carbonates or hydroxide, may be added to the system of this invention to replace sodium loss, including that removed in the sodium sulfate solids which are precipitated. Advantageously, this addition is to the lean absorbing solution to which make-up water may also be added.

In the sulfur dioxide desorption stage of the method of this invention the spent absorption medium is subjected to elevated temperatures to convert sodium bisulfite into sodium sulfite with the concomitant formation of a vapor phase containing sulfur dioxide and water. Suitable temperatures for this operation include about 40° to 110° C., preferably about 60° to 95° C. The pressure may be about 3 to 21 psia, preferably about 8 to 15 psia. The vapor phase can be treated for the recovery of purer sulfur dioxide, the manufacture of sulfur, or used, treated or disposed of in any other suitable manner. Various procedures for sulfur dioxide desorption can be used and a number are known in the art. It is preferred, however, that the desorption be accomplished with the simultaneous formation of an undissolved solids or crystal phase which enables the desorption to be accomplished with the use of lesser amounts of heat. In such operations the amount of undissolved solids in the desorption zone is generally at least about 15 weight percent of the slurry undergoing decomposition or sulfur dioxide desorption. As described in U.S. Pat. No. 3,790,660 the amount of such solids is advantageously at least about 25 weight percent in order to alleviate difficulties of tube fouling, particularly when supplying heat to the desorption zone by passing the slurry through the tubes of an indirect heat exchanger. Preferably, the amount of undissolved solids is about 30 to 50 weight percent of the slurry undergoing decomposition. Also when the amount of undissolved solids is sufficiently high, the sodium sulfite content of the slurry may be adequate for a portion of the total slurry to be combined with water to dissolve the solids, and the resulting solution can be used as the lean solution for absorbing sulfur dioxide from the gas being treated in the absorption zone of the absorption-desorption system. The lean absorbing solution is usually composed to a major weight extent of sodium sulfite and minor weight amounts of sodium bisulfite and sodium sulfate based on the total amount of these salts present. Often the lean absorbing solution has about 10 to 35 weight percent sodium sulfite, about 3 to 15 weight percent sodium bisulfite, and about 1 to 10 weight percent sodium sulfate based on these components and water present.

The present invention will be further described by reference to the drawing which is a schematic flow diagram of a process employing the present invention in an absorption-desorption system using sodium sulfite for removal and recovery of sulfur dioxide from flue gas. Equipment such as valves, pumps, heat exchangers, surge tanks, and the like, which would be used in a commercial embodiment of the invention and in the operation of an absorption-desorption system, is not shown since it can be of conventional design and employed in accordance with practices well known in the art.

Referring to the drawing, sulfur dioxide-containing flue gas, which may, for example, contain from about 0.05 to about 5 mole percent sulfur dioxide, enters absorber vessel 10 by way of line 12 near the bottom thereof. Water or other aqueous liquid may be passed co-currently with the flue gas to a bed of column packing in the lower portion of vessel 10 to scrub the gas to remove suspended solids such as fly-ash and the relatively high water-soluble components, for instance, sulfur trioxide, hydrogen chloride and the like from the flue gas.

The flue gas passes upwardly through absorber 10 and liquid-gas contacting means such as sieve trays and through a descending flow of lean absorbing solution which is supplied to vessel 10 by line 14. The lean absorbing solution contains sodium sulfite as the essential sulfur dioxide-absorbing component. Absorber 10 may employ other types of liquid-arm contacting structures, such as packing, bubble caps, alternate ring and discs or the like. The lean absorbing solution in line 14 is often at a temperatue of at least about 30° C., preferably at least about 40° C., up to about 110° C., preferably up to about 70° C. Flow rates of the aqueous absorbing solution through the absorption zone can be adjusted according to the sulfur dioxide concentration in the gas being treated, and the concentration of sodium sulfite in the solution, so that a major amount, e.g., up to about 95% or more, of the sulfur dioxide may be removed from the gas by reaction with the lean absorbing solution. The treated gas leaves absorber 10 by way of line 13. Spent absorbing solution is collected on gas passing tray 17 in absorber 10 and removed from the latter by line 16.

The spent absorbing solution is transferred by pump 18 and line 54 to heater 52 and thence by line 56 to desorber 50. A portion, or even all, of the spent absorbing solution is withdrawn from line 54 by line 22. The stream in line 22 containing sodium sulfate, as well as sodium sulfite and bisulfite in solution, is passed to evaporator or dehydrator 24 in accordance with this invention. Heat may be supplied to evaporator 24 by steam coil 26, and the added heat serves to cause the removal of water from the spent absorbing solution and the precipitation of sodium sulfate-containing solids. The water and any sulfur dioxide in the vapor in evaporator 24 is removed by line 36.

A portion of the spent absorbing medium undergoing dehydration in evaporator 24 is withdrawn via line 40 and passed to crystal separator 42 which may be selected from conventional processing equipment for effecting separation of solids and liquids such as filters, including rotary filters, centrifuges, clarifiers and other sedimentation equipment. Solids rich in sodium sulfate crystals and containing sodium sulfite can be removed by line 44, and the resulting liquid stream having sulfate removed therefrom can be sent via line 46, pump 48, lines 49 and 54, heater 52 and line 56 to desorber 50 for processing to desorb sulfur dioxide and to regenerate the absorbing solution.

The desorber section of the system, which can be operated in the manner, for example, shown in U.S. Pat. No. 3,790,660, is for convenience shown as a single stage desorber, but two or more stages may be used. The heated solution in line 56 is introduced into the desorber 50. The conditions of temperature, pressure, and residence time in desorber 50 are so maintained as to effect the desired decomposition of sodium bisulfite, evaporation of sulfur dioxide and water, and precipitation of sodium sulfite-containing crystals as described above and in said patent.

To supply heat to desorbing vessel 50 a recycle stream is heated in heat exchanger 58. In order to effect heating in vessel 50, the slurry in the vessel is withdrawn by line 60, and passes through pump 62, line 63, metallic tubes of heat exchanger 58 and back to vessel 50 by way of lines 64 and 56. Steam is introduced to heat exchanger 58 through line 66 as the prime energy source for the desorption zone. The condensate (water) from heat exchanger 58 is removed through line 68. The sulfur dioxide and water vapors from decoder 50 are removed by line 74. A portion of the slurry in desorber 50 is passed to dissolving tank 72 by way of line 78. Since water has been removed from the absorption solution during desorption, make up water, for example, from rectification (not shown), is supplied to tank 72 through line 80. The solution formed in dissolving tank 72 passes through line 82, pump 84, and line 14 to absorber 10. Make-up sodium ion, which may be an aqueous sodium hydroxide or carbonate solution, is added to line 82 through line 88.

Other ways of conducting the limited precipitation of solids from the absorption-desorption medium may be used in conducting the method of this invention. For example, the medium may be dehydrated while being contacted with a sulfur dioxide-containing gas charged to the dehydrator as described in patent application Ser. No. 647,516, filed Jan. 8, 1976, in the names of Edgar E. Bailey, Norman E. Nicholson, John Frederick Flintoff and John Scarlett.

The following examples will further illustrate the present invention, but do not limit it.

EXAMPLE 1

This example gives the results of batch evaporation tests performed on synthetically prepared, spent absorber solutions as would be obtained in an absorption operation of the type shown in the drawing. In the tests the spent absorption solution was placed under vacuum in a flask maintained in a constant temperature bath. The evaporations were conducted at the temperatures noted in Table I, and were continued until the indicated amount of solids had been formed in a given spent absorption solution. The water evaporated in each test was condensed and collected. The crystals were separated from the mother liquor at the temperature of evaporation. The most pertinent data obtained in these tests are in Table I.

TABLE I

|  | Test No. |  | 1 | 2 | 3 | 4 | 5 | 6 | 7 |
|---|---|---|---|---|---|---|---|---|---|
| SPENT | $Na_2SO_3$ | % wt. | 5.82 | 5.74 | 6.03 | 6.94 | 5.84 | 5.75 | 5.87 |
| ABSORBER | $NaHSO_3$ (calc. as | | | | | | | | |
| SOLUTION | $Na_2S_2O_5$) | " | 18.98 | 18.80 | 20.06 | 24.31 | 19.73 | 19.63 | 19.73 |
| ANALYSIS | $Na_2SO_4$ | " | 8.50 | 8.07 | 8.76 | 7.49 | 7.91 | 8.68 | 8.46 |
|  | $Na_2S_2O_3$ | " | 0.30 | 0.29 | 0.33 | 0.41 | 0.30 | 0.33 | 0.31 |
|  | $H_2O$ (by diff) | " | 66.40 | 67.10 | 64.82 | 60.85 | 66.22 | 65.60 | 65.62 |
|  | Vol. | ccs | 500 | 500 | 500 | 500 | 500 | 500 | 500 |
|  | Wt. | g | 649.0 | 649.0 | 648.0 | 657.4 | 654.8 | 654.0 | 649.4 |
|  | Density | g/cc | 1.34 | 1.27 | 1.30 | 1.36 | 1.33 | 1.35 | 1.33 |
| EVAPORA- | WATER REMOVED | g | 101 | 122 | 206 | 109 | 273 | 298 | 351 |
| TION | TEMPERATURE | °C. | 86 | 85 | 92 | 86 | 87 | 86 | 86 |
| SOLIDS CONTENT |  |  |  |  |  |  |  |  |  |
| OF SLURRY |  | % wt. | 1.1 | 4.8 | 11.1 | 17.1 | 22.0 | 28.9 | 44.1 |
|  | $Na_2SO_3$ | % wt. | 8.05 | 7.73 | 7.73 | 8.60 | 6.91 | 6.38 | 4.08 |
| MOTHER | $NaHSO_3$ (calc. as | | | | | | | | |

TABLE I-continued

| Test No. | | | 1 | 2 | 3 | 4 | 5 | 6 | 7 |
|---|---|---|---|---|---|---|---|---|---|
| LIQUOR ANALYSIS | $Na_2S_2O_5$) | " | 22.01 | 23.03 | 26.38 | 31.11 | 35.81 | 36.68 | 42.58 |
| | $Na_2SO_4$ | " | 9.94 | 6.67 | 5.68 | 5.48 | 3.78 | 4.75 | 3.73 |
| | $Na_2S_2O_3$ | " | 0.38 | 0.39 | 0.60 | 0.48 | 0.65 | 0.73 | 1.05 |
| | $H_2O$(by diff.) | " | 59.62 | 62.18 | 59.61 | 54.34 | 52.85 | 51.46 | 48.57 |
| DRY CRYSTALS ANALYSIS* | $Na_2SO_3$ | % wt. | 19.6 | 26.90 | 37.43 | 41.02 | 46.12 | 44.11 | 56.81 |
| | $NaHSO_3$(calc. as $Na_2S_2O_5$) | " | NIL | 1.07 | NIL | NIL | NIL | NIL | NIL |
| | $Na_2SO_4$ | " | 80.4 | 72.03 | 62.57 | 58.98 | 53.88 | 55.89 | 43.19 |
| | $H_2O$ (by diff) | " | NIL | NIL | NIL | NIL | NIL | NIL | NIL |

*Calculated free of mother liquor and expected on a dry basis.

From the data in Table I it can be seen that, as the solids content of the mixture undergoing evaporation increased, the sulfate to sulfite ratio in the crystals decreased. Only in tests 1 and 2, having respectively, 1.1 and 4.8 weight percent solids formed in the material evaporated, did the dry crystal product have greater than about 65 weight percent sulfate.

EXAMPLE 2

Additional batch tests were conducted in a similar manner, but using spent absorber solutions obtained from an operating commercial installation in which sulfur dioxide was being absorbed from a gas in a system of the type shown in the drawing. In these tests, each spent absorber solution was evaporated at about 105° C. and atmospheric pressure in a stirred, stainless steel beaker until the stated amount of solids appeared. The solids were separated in a laboratory centrifuge 15 cm. in diameter, 5 cm. in height, operating at approximately 2800 rpm. The centrifuge basket was covered with 316 stainless steel, 150 mesh. The separated crystals and the mother liquor were weighed and analysed. In almost all cases the crystals produced could be centrifuged easily. The results of the tests are given in Table II.

The results of these larger scale tests confirm the laboratory results shown in Example I. The data clearly show that the dry solids were high in sulfate content, and generally that the sulfate content decreased as the amount of solids formed during the evaporation increased.

EXAMPLE 3

To determine the effect of sulfate and sulfite concentration in the spent absorber solution on the sulfate content of the separated crystal product, batch evaporation tests were performed on synthetically prepared, spent absorber solutions as would be obtained in an absorption operation of the type shown in the drawing. In the tests the spent absorption solution was placed in a flask maintained in a constant temperature bath. The evaporation were conducted under vacuum a the temperatures noted in Table III, and were continued until the indicated amount of solids had been formed in a given spent absorption solution. The water evaporated in each test was condensed and collected. The crystals were separated from the mother liquor at the temperature of evaporation. The levels of sulfate in the spent absorber solutions were varied in the tests but the per-

TABLE II

| Test No. | | | 1 | 2 | 3 | 4 | 5 | 6 |
|---|---|---|---|---|---|---|---|---|
| Spent Absorber Solution Taken | | g | 1300 | 1316 | 1318 | 1308 | 1343 | 1324 |
| Water Evaporated | | g | (420)[1] | (350) | — | 281 | 286 | 273 |
| Mother Liquor Separated | | g | 752 | 867 | 1009 | 931 | 962 | 960 |
| Wet Crystals Collected | | g | 89.9 | 64.3 | 10.1 | 37.7 | 41.7 | 41.4 |
| Solids Content of Slurry | | % wt. | 7.9 | 5.7 | 0.9 | 3.0 | 3.6 | 3.1 |
| SPENT ABSORBER SOLUTION ANALYSIS | $Na_2SO_4$ | % wt. | 5.47 | 5.32 | — | 5.20 | — | 5.36 |
| | $Na_2SO_3$ | " | 0.87 | 0.91 | — | 0.84 | — | 0.90 |
| | $NaHSO_3$ calc. as $Na_2S_2O_5$) | " | 31.48 | 31.83 | — | 32.67 | — | 31.85 |
| | $Na_2S_2O_3$ | " | 0.14 | 0.10 | — | 0.15 | — | 0.10 |
| | $H_2O$ (by diff) | " | 62.04 | 61.84 | — | 61.14 | — | 61.55 |
| MOTHER LIQUOR ANALYSIS | $Na_2SO_4$ | % wt. | 3.80 | 4.38 | 5.88 | 5.26 | 4.72 | 4.84 |
| | $Na_2SO_3$ | " | 5.57 | 5.21 | 5.31 | 5.36 | 5.35 | 5.28 |
| | $NaHSO_3$ (calc. as $Na_2S_2O_5$) | " | 39.24 | 40.24 | 88.81 | 5.16 | 35.22 | 89.88 |
| | $Na_2S_2O_3$ | " | 0.30 | 0.33 | | 54.22 | 0.30 | |
| | $H_2O$ (by diff) | " | 51.09 | 49.84 | | 54.41 | | |
| CRYSTALS ANALYSIS (With $NaHSO_3$ (calc. as (Adhering Mother Liquor) | $Na_2SO_4$ | % wt. | 43.44 | 53.00 | 65.80 | 55.09 | 60.17 | 56.70 |
| | $Na_2SO_3$ | " | 34.51 | 31.10 | 23.47 | 22.80 | 24.58 | 19.48 |
| | $Na_2S_2O_5$) | " | 7.52 | 6.78 | 10.69 | 8.77 | 5.34 | 23.82 |
| | $Na_2S_2O_3$ | " | 0.10 | 0.08 | | | 0.08 | |
| | $H_2O$ (by diff) | " | 14.43 | 8.74 | | 13.34 | 9.83 | |
| CRYSTALS ANALYSIS[2] | $Na_2SO_4$ | % wt. | 55.6 | 63.4 | 74.0 | 71.4 | 71.4 | 75.4 |
| | $Na_2SO_3$ | " | 44.4 | 36.6 | 26.0 | 28.6 | 28.6 | 24.6 |

[1]( ) = Approximation
[2]Calculated free of mother liquor and expected on a dry basis centage of the salts in solution were kept relatively constant. The most pertinent data obtained in these tests are in Table III.

TABLE III

| | Test No. | | 1 | 2 | 3 | 4 | 5 | 6 | 7 | 8 | 9 |
|---|---|---|---|---|---|---|---|---|---|---|---|
| SPENT ABSORBER SOLUTION ANALYSIS | $Na_2SO_3$ | % wt. | 5.48 | 5.39 | 6.63 | 6.45 | 5.62 | 6.33 | 0.16 | 0.14 | 0.25 |
| | $NaHSO_3$ (calc. as $Na_2S_2O_5$) | " | 19.44 | 14.33 | 23.44 | 18.71 | 19.83 | 16.77 | 23.40 | 27.50 | 25.65 |
| | $Na_2SO_4$ | " | 9.37 | 9.80 | 3.93 | 3.26 | 8.53 | 4.98 | 8.86 | 4.00 | 6.56 |
| | $Na_2S_2O_3$ | " | 0.30 | 0.32 | 0.32 | 0.30 | 0.33 | 0.32 | 0.32 | 0.31 | 0.32 |
| | $H_2O$ (by diff) | " | 65.41 | 70.12 | 65.69 | 72.28 | 65.69 | 71.59 | 67.26 | 68.05 | 67.21 |
| | Vol. taken | ccs | 500 | 500 | 500 | 500 | 500 | 500 | 500 | 500 | 500 |
| | Wt. taken | g | 652 | 654 | 637.4 | 640.8 | 640 | 637.5 | 641.2 | 639.4 | 649.2 |
| | Density | g/cc | 1.304 | 1.35 | 1.30 | 1.31 | 1.30 | 1.33 | 1.31 | 1.31 | 1.31 |
| | Water Removed | g | 130 | 130 | 153 | 168 | 136 | 155 | 139 | 176 | 156 |
| EVAPORATION | Temperature | °C. | 102 | 84 | 83 | 83 | 84 | 83 | 84 | 84 | 84 |
| | Solids Content of Slurry | % wt. | 11.2 | 5.8 | 4.2 | 4.5 | 4.4 | 5.8 | 4.2 | 3.7 | 4.89 |
| MOTHER LIQUOR ANALYSIS | $Na_2SO_3$ | % wt. | 6.94 | 7.22 | 8.79 | 9.37 | 7.77 | 9.07 | 5.30 | 7.32 | 6.36 |
| | $NaHSO_3$ (calc. as $Na_2S_2O_5$) | " | 20.80 | 17.44 | 29.67 | 22.80 | 23.66 | 19.55 | 22.96 | 28.95 | 26.67 |
| | $Na_2SO_4$ | " | 7.13 | 9.18 | 4.02 | 3.92 | 7.99 | 4.06 | 8.53 | 4.88 | 6.70 |
| | $Na_2S_2O_3$ | " | 0.51 | 0.43 | 0.46 | 0.45 | 0.44 | 0.45 | 0.48 | 0.52 | 0.52 |
| | $H_2O$ (by diff) | " | 64.62 | 65.73 | 57.06 | 63.46 | 60.14 | 66.87 | 62.71 | 58.33 | 59.75 |
| CRYSTALS ANALYSIS* | $Na_2SO_3$ | % wt. | 25.88 | 22.34 | 68.06 | 67.30 | 26.24 | 44.08 | 7.6 | 48.78 | 29.11 |
| | $NaHSO_3$ (calc. as $Na_2S_2O_5$) | " | 4.43 | 3.08 | NIL | 3.36 | 2.02 | 5.66 | NIL | NIL | NIL |
| | $Na_2SO_4$ | " | 69.53 | 74.58 | 31.04 | 29.33 | 71.74 | 50.25 | 92.4 | 51.23 | 70.89 |
| | $Na_2S_2O_3$ | " | 0.16 | NIL | NIL | NIL | NIL | NIL | NIL | NIL | NIL |

*Calculated free of mother liquor and expected on a dry basis

The data of Table III illustrate the effect of the sulfate and sulfite concentrations in the spent absorber solution on the concentration of sulfate in the separated crystal product. These data show that an increase of about 1 percent sulfate (at constant sulfite concentration) in the spent absorber solution gave an increase of about 5 to 10 percent sulfate in the dry crystal product. Also a decrease of about 6 percent sulfite (at constant sulfate concentration) in the spent absorbing solution gave an increase of about 15 to 20 percent sulfate in the dry crystal product.

Various modifications and equivalents of the process of this invention will be apparent to one skilled in the art, and may be made without departing from the spirit or scope of the invention.

It is claimed:

1. In a process for the removal of sulfur dioxide from gas in which sulfur dioxide is absorbed from the gas in an aqueous absorption solution of sodium sulfite to form the corresponding bisulfite in an absorption zone, resulting bisulfite-containing spent absorption solution is desorbed in a desorption zone to form sulfur dioxide and crystalline sodium sulfite from solution and provide a slurry in said desorption zone containing at least about 25 weight percent solids, and a sulfite-containing absorption solution is regenerated for recycling by dissolution of crystallized sodium sulfite, and in which sodium sulfate is in the absorption-desorption medium, the improvement for removing sulfate from the system comprising dividing said spent absorption solution into portions, said spent absorption solution containing about 1 to about 10 weight percent of sodium sulfate and about 0.1 to 10 weight percent of sodium sulfite, said spent absorption solution containing a major amount of sodium bisulfite based on the weight of said satls, passing one of said portions to said desorption zone, evaporating water at a temperature of at least about 37° C. from another portion of said spent aqueous absorption-desorption solution to precipitate up to about 10 weight percent undissolved solids from said solution, said undissolved solids having a major amount of sulfate and a minor amount of sulfite, separating sulfate and sulfite-containing precipitate and bisulfite-containing solution from the resulting slurry, and passing said latter solution to the absorption-desorption cycle.

2. A process of claim 1 in which said slurry contains about 1 to 5 weight percent of undissolved solids precipitated from said solution which solids contain at least about 50 weight percent of sodium sulfate.

3. In a process for the removal of sulfur dioxide from gas in which sulfur dioxide is absorbed from the gas in an aqueous absorption solution of sodium sulfite to form the corresponding bisulfite in an absorption zone, resulting bisulfite-containing spent absorption solution is desorbed in a desorption zone to form sulfur dioxide and crystallize sodium sulfite from solution and provide a slurry in said desorption zone containing at least about 25 weight percent solids, and a sulfite-containing absorption solution is regenerated for recycling by dissolution of crystallized sodium sulfite, and in which sulfate is in the spent solution from said absorption, the improvement for removing sulfate from the system comprising dividing said spent absorption solution into portions, said spent absorption solution containing about 1 to about 10 weight percent of sodium sulfate and about 1 to 10 weight percent of sodium sulfite, said spent absorption solution containing a major amount of sodium bisulfite based on the weight of said salts, passing one of said portions to said desorption zone, evaporating water from another portion of said spent absorption solution at a temperature of about 40° to 120° C. to precipitate about 1 to 5 weight percent of undissolved solids from said spent absorption solution said solids containing a major amount of sodium sulfate and a minor amount of sodium sulfite, separating sulfate and sulfite-containing precipitate and bisulfite-containing solution from the resulting slurry, and passing said latter solution to said desorption zone to desorb sulfur dioxide from said bisulfite-containing solution.

4. The process of claim 3 in which said slurry contains about 1 to 5 weight percent of undissolved solids precipitated from said spent absorption solution which solids contain at least about 70 weight percent of sodium sulfate.

5. The process of claim 3 in which the spent absorbing solution has an s/c of about 0.85 to 0.97.

6. In a process for the removal of sulfur dioxide from gas in which sulfur dioxide is absorbed from the gas in an aqueous absorption solution of sodium sulfite to form the corresponding bisulfite in an absorption zone, resulting bisulfite-containing spent absorption solution is desorbed in a desorption zone to form sulfur doxide and crystalline sodium sulfite from solution and provide a slurry in said desorption zone containing at least about 25 weight percent solids, and a sulfite-containing absorption solution is regenerated for recycling by dissolution of crystallized sodium sulfite, and in which sodium sulfate is in the absorption-desorption medium, the improvement for removing sulfate from the system comprising separating a portion of said absorption-desorption medium from said absorption-desorption cycle, evaporating water from a separated portion of said absorption-desorption medium containing about 1 to about 10 weight percent of sodium sulfate and about 0.1 to 10 weight percent of sodium sulfite, said absorption-desorption medium having a major amount of sodium bisulfite based on the weight of said salts, said evaporation of water being at a temperature of at least about 37° C. to precipitate up to about 10 weight percent undissolved solids from said medium, said undissolved solids having a major amount of sulfate and a minor amount of sulfite, separating sulfate and sulfite-containing precipitate and bisulfite-containing solution from the resulting slurry, and passing said latter solution to the absorption-desorption cycle.

7. The process of claim 6 in which the portion of said absorption-desorption medium subjected to said evaporation of water is about 20 to 75 weight percent of the medium withdrawn from said absorption-desorption cycle.

8. The process of claim 7 in which the amount of sodium sulfite in said absorption-desorption medium is about 1 to 10 weight percent.

9. The process of claim 1 or 3 in which the portion of said spent absorption solution subjected to said evaporation water is about 20 to 75 weight percent of the total spent absorption solution withdrawn from said absorption zone.

10. The process of claim 1 or 5 in which the temperature of said evaporation is about 40° to 120° C.

* * * * *

UNITED STATES PATENT AND TRADEMARK OFFICE
CERTIFICATE OF CORRECTION

PATENT NO. : 4,216,189

DATED : August 5, 1980

INVENTOR(S) : Norman E. Nicholson Et Al.

It is certified that error appears in the above—identified patent and that said Letters Patent is hereby corrected as shown below:

Column 4, line 17, after "sodium" insert --sulfate to sodium--.

Column 4, line 38, "of" (first occurrence) should be -- or --

Column 4, line 58 after, "ited," insert --amount of solids.--.

Column 4, line 59 delete "amount of solids.".

Column 4, line 61 after "from" insert --the--.

Columns 9 and 10, TABLE II, after "SOLUTION NaHSO$_3$" insert --(--

Columns 9 and 10, TABLE II, "54.41" should be under Test No. 5, and not Test No. 4.

Column 11, line 63, "satls" should be --salts--.

Signed and Sealed this

Twenty-fifth Day of November 1980

[SEAL]

Attest:

SIDNEY A. DIAMOND

Attesting Officer

Commissioner of Patents and Trademarks